United States Patent
Wyrick et al.

(10) Patent No.: US 9,103,540 B2
(45) Date of Patent: Aug. 11, 2015

(54) HIGH EFFICIENCY LED LIGHTING SYSTEM WITH THERMAL DIFFUSION

(75) Inventors: Sam Wyrick, Oakley, CA (US); Sean Malone, Las Vegas, NV (US); Brian Lauzon, Las Vegas, NV (US)

(73) Assignee: OptaLite Technologies, Inc., Las Vegas, NV (US)

( * ) Notice: Subject to any disclaimer, the term of this patent is extended or adjusted under 35 U.S.C. 154(b) by 58 days.

(21) Appl. No.: 13/453,444

(22) Filed: Apr. 23, 2012

(65) Prior Publication Data

US 2013/0107530 A1    May 2, 2013

Related U.S. Application Data

(60) Provisional application No. 61/478,049, filed on Apr. 21, 2011.

(51) Int. Cl.

| F21S 4/00 | (2006.01) |
| F21V 21/00 | (2006.01) |
| F21V 29/00 | (2015.01) |
| H05B 33/08 | (2006.01) |
| A01G 9/26 | (2006.01) |
| F21V 29/15 | (2015.01) |
| F21V 29/70 | (2015.01) |
| F21V 23/00 | (2015.01) |
| F21S 9/03 | (2006.01) |
| F21V 5/00 | (2015.01) |
| F21V 11/04 | (2006.01) |
| F21Y 105/00 | (2006.01) |
| F21Y 111/00 | (2006.01) |
| F21Y 113/00 | (2006.01) |

(52) U.S. Cl.
CPC . *F21V 29/22* (2013.01); *A01G 9/26* (2013.01); *F21V 29/15* (2015.01); *F21V 29/70* (2015.01); *H05B 33/0803* (2013.01); *F21S 9/03* (2013.01); *F21V 5/002* (2013.01); *F21V 11/04* (2013.01); *F21V 23/00* (2013.01); *F21Y 2105/003* (2013.01); *F21Y 2111/001* (2013.01); *F21Y 2113/005* (2013.01)

(58) Field of Classification Search
CPC . H01L 25/075; H01L 25/0783; F21V 7/0083; F21V 7/0066; F21V 29/15; F21V 29/20; F21V 29/22; F21V 29/70; H05B 33/0803
USPC ............... 362/249.02, 294, 311.02, 800, 545
See application file for complete search history.

(56) References Cited

U.S. PATENT DOCUMENTS

| 2,815,696 A | 12/1957 | Brownscombe |
| 4,339,789 A | 7/1982 | Husby et al. |
| 5,090,805 A | 2/1992 | Stawarz |

(Continued)

*Primary Examiner* — Jason Moon Han
(74) *Attorney, Agent, or Firm* — Temmerman Law Office; Mathew J. Temmerman

(57) ABSTRACT

An apparatus including an LED lighting system for use within AC current and comprising a multi-phase circuit design providing an improved power delivery means which allows one half of the LEDs in the system to be lit during any given one half of the alternating current cycle and the other half to be lit during the other half of the current cycle. Further, a heat sink module comprising heat sink fins mates with custom LED footprints such that the module is mated to the footprints on at least ⅓ of its total surface area. Finally, the LED lighting apparatus and system comprises a faceplate comprising a beveled aperture through said faceplate directly above each LED, and wherein said bevel angle is at least zero and no more than 120 degrees.

13 Claims, 11 Drawing Sheets

(56) References Cited

U.S. PATENT DOCUMENTS

| | | |
|---|---|---|
| 5,158,348 A | 10/1992 | Sakamoto et al. |
| 5,162,696 A * | 11/1992 | Goodrich .................. 313/511 |
| 5,857,767 A | 1/1999 | Hochstein |
| 6,354,714 B1 | 3/2002 | Rhodes |
| 6,361,190 B1 | 3/2002 | McDermott |
| 6,428,189 B1 | 8/2002 | Hochstein |
| 6,480,389 B1 | 11/2002 | Shie et al. |
| 6,517,218 B2 | 2/2003 | Hochstein |
| 6,561,680 B1 | 5/2003 | Shih |
| 6,567,009 B2 | 5/2003 | Ohishi et al. |
| 6,573,536 B1 | 6/2003 | Dry |
| 6,582,100 B1 | 6/2003 | Hochstein et al. |
| 6,590,773 B1 | 7/2003 | Lin |
| 6,712,486 B1 | 3/2004 | Popovich et al. |
| 6,827,468 B2 | 12/2004 | Galli |
| 6,871,981 B2 | 3/2005 | Alexanderson et al. |
| 6,999,318 B2 | 2/2006 | Newby |
| 7,044,620 B2 | 5/2006 | Van Duyn |
| 7,134,768 B2 | 11/2006 | Suzuki |
| 7,235,878 B2 | 6/2007 | Owen et al. |
| 7,420,811 B2 | 9/2008 | Chan |
| 7,434,964 B1 | 10/2008 | Zheng et al. |
| 7,513,653 B1 | 4/2009 | Liu et al. |
| 7,638,953 B2 | 12/2009 | Denville |
| 7,654,699 B2 | 2/2010 | Chang et al. |
| 7,744,247 B2 | 6/2010 | Zhang et al. |
| 7,753,544 B2 | 7/2010 | Ohta et al. |
| 7,753,556 B1 | 7/2010 | Zhang et al. |
| 7,784,955 B2 | 8/2010 | Choi et al. |
| 7,784,972 B2 | 8/2010 | Heffington et al. |
| 7,789,528 B2 | 9/2010 | Mo et al. |
| 7,800,909 B2 | 9/2010 | Sun |
| 7,819,556 B2 | 10/2010 | Heffington et al. |
| D626,519 S | 11/2010 | Yao |
| 7,868,305 B2 | 1/2011 | Gupta et al. |
| 7,874,701 B2 | 1/2011 | Pohlert et al. |
| 7,884,896 B2 | 2/2011 | Park |
| 8,039,849 B2 * | 10/2011 | Lam .................. 257/88 |
| 8,272,757 B1 * | 9/2012 | Fan et al. .................. 362/231 |
| 8,482,014 B2 * | 7/2013 | Higuchi et al. .................. 257/88 |
| 2005/0084229 A1 | 4/2005 | Babbitt et al. |
| 2005/0207165 A1 * | 9/2005 | Shimizu et al. .................. 362/362 |
| 2005/0242734 A1 | 11/2005 | Maxik |
| 2006/0012984 A1 | 1/2006 | Coushaine et al. |
| 2006/0180821 A1 | 8/2006 | Fan et al. |
| 2006/0227546 A1 | 10/2006 | Yeo et al. |
| 2007/0258247 A1 | 11/2007 | Park et al. |
| 2008/0055900 A1 | 3/2008 | Budike |
| 2008/0149305 A1 | 6/2008 | Chen |
| 2008/0185969 A1 | 8/2008 | Vegter et al. |
| 2010/0027085 A1 | 2/2010 | Catalano |
| 2010/0059592 A1 | 3/2010 | Barsotti |
| 2010/0128473 A1 | 5/2010 | Parra |
| 2010/0213835 A1 | 8/2010 | Mo et al. |

* cited by examiner

FLOOD LIGHT          SPOT LIGHT

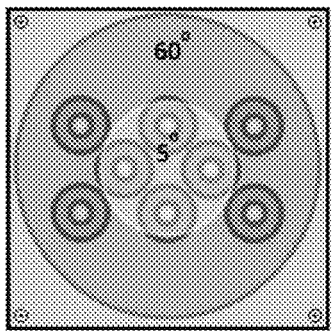
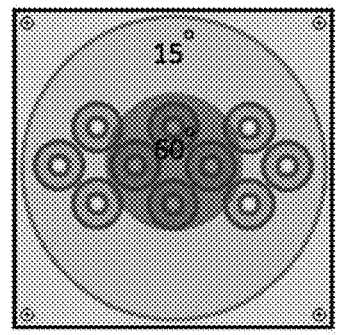
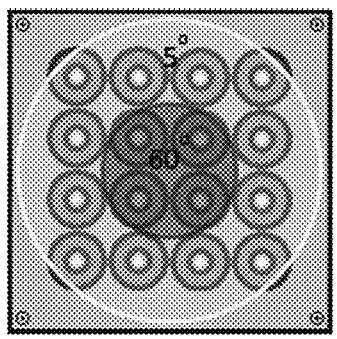
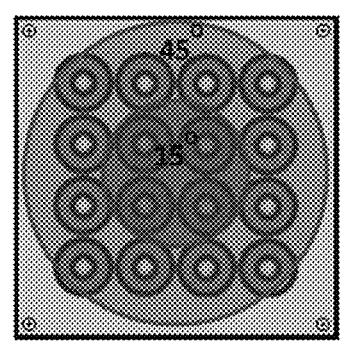
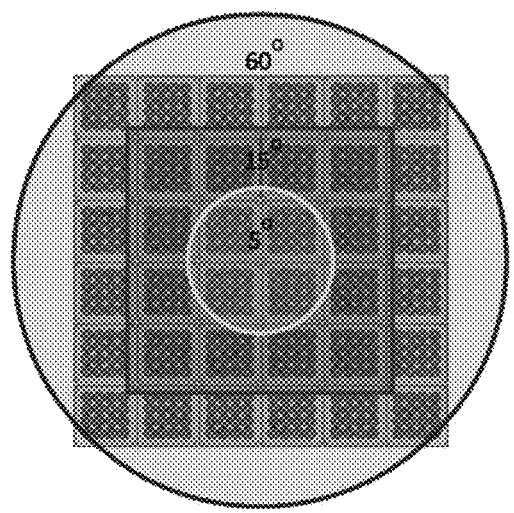
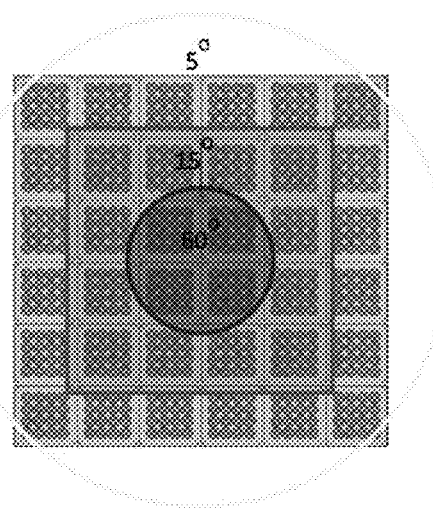
*Fig. 7*

TEST DATA:

| Single Light Lamppost Parking Lot Light – One Opta-1K lamp: spread (in LUX) | | | | | | | |
|---|---|---|---|---|---|---|---|
| | Center | 5 ft | 10 ft | 15 ft | 20 ft | 40 ft | 50 ft |
| 25 Feet | 42.1 | 24.2 | 14 | 10 | 8.3 | 1.2 | .11 |
| 30 Feet | 31.1 | 19.7 | 12 | 9.1 | 8.2 | 1.1 | .05 |
| 35 Feet | 25.4 | 18.3 | 11.5 | 9.1 | 8.2 | .9 | .02 |
| 40 Feet | 21.4 | 14.6 | 9.6 | 8.1 | 7.4 | .09 | .01 |

Y Axis (Vertical) ↓

X Axis (horizontal) →

| Dual Light Lamppost Parking Lot Light – Two Opta-1K lamps @ 5ft apart: spread (in LUX) | | | | | | | |
|---|---|---|---|---|---|---|---|
| | Center | 5 ft | 10 ft | 15 ft | 20 ft | 40 ft | 50 ft |
| 25 Feet | 75.2 | 46.1 | 17.5 | 15.0 | 15.0 | 2.3 | 0.1 |
| 30 Feet | 45.3 | 36.0 | 17.4 | 14.4 | 14.4 | 2.0 | 0.05 |
| 35 Feet | 44.5 | 34.7 | 17.4 | 14.4 | 14.4 | 1.1 | 0.03 |
| 40 Feet | 37.7 | 32.9 | 17.2 | 14.2 | 14.2 | 0.9 | 0.01 |

Y Axis (Vertical) ↓

X Axis (horizontal) →

NOTE: All measurements taken with REED ST-1301 light meter and stated in LUX. Meter capable of reading up to 50,000 LUX.

*Fig. 9*

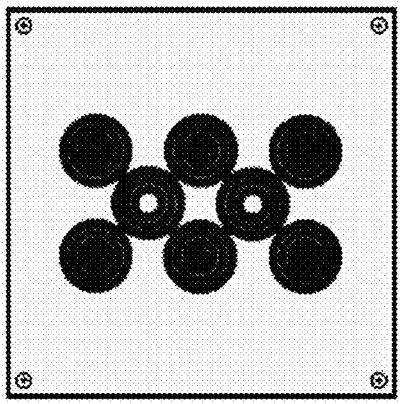 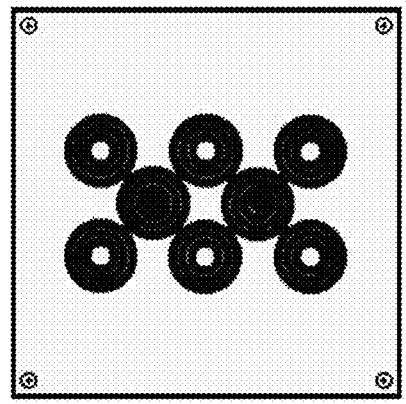
*Fig. 10*
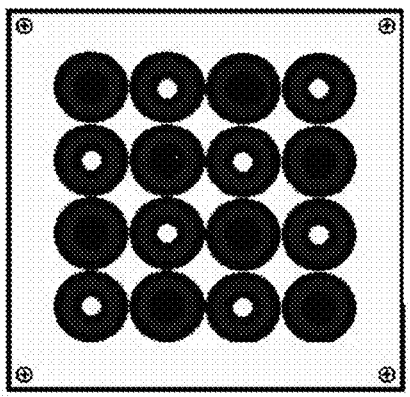 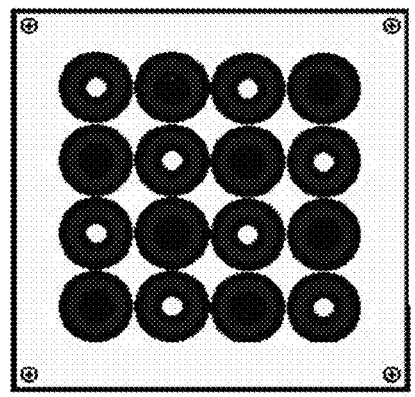
*Fig. 11*

HIGH EFFICIENCY LED LIGHTING SYSTEM WITH THERMAL DIFFUSION

RELATED APPLICATIONS

The present application claims priority from U.S. Provisional Patent Application 61/478,049, filed Apr. 21, 2011, which is incorporated by reference herein.

BACKGROUND

1. Field of the Invention

The present invention relates in general to lighting technology and in particular to an LED-based lighting system designed to maximize energy efficiency and optimize thermal diffusion.

2. Background of the Invention

In recent years light systems based on light-emitting diodes (LED), a semiconductor light source, have become popular and widespread. Since becoming a practical source of light in the 1960s, LED based lights have moved to the mainstream and are now used in a wide variety of applications, ranging from LED headlamps, to LED replacement light bulbs, to LED based flood and streetlights. The efficiency and light output of LEDs has risen exponentially and they are now commonly understood to be a satisfactory light source for many applications.

High-power LEDs may be driven at current from hundreds of mA to more than an ampere, and single LEDs can now emit over one thousand lumens. However, in such uses heat management becomes a very important issue, and heat buildup is one of the leading causes of early LED failure. The issue often leads to LED lighting solutions that appear underpowered and do not create enough usable ambient light. Current heat reduction systems are inadequate to dissipate proper amounts of the heat bi-product causing reduction of LED lifespan, premature failure, and loss of ambient light. The present application addresses these and other problems.

Another emerging downside is the fact that most LEDs are incompatible with dimmers. Much of the modern adoption of LEDs has been in systems wherein incandescent bulbs are replaced with LEDs. In many of these system dimmers are already in place. While some LED lights can be used with line-voltage incandescent dimmers, but the dimmer and LED driver electronics are not always compatible. It is thus not possible to guarantee that a given LED fixture will work with all dimmers. There is thus a need to avoid retrofitting existing dimmer systems and to at the same time guarantee that an LED light will be functional with any existing dimmer.

Although LEDs are understood as a much more efficient means of lighting, there is still a need for further efficiencies. One source of inefficiencies in the systems is due to the power conversion from alternating current to direct current that is generally associated with such systems. In these systems there is some amount of phantom power loss, due to the DC converter trickling a small amount of power, even when the system is off.

Relevant prior art attempting to address these and other drawbacks include the following utility patents, design patents and published utility patent applications.

U.S. Pat. No. 2,815,696, issued on Dec. 10, 1957 to Philip Brownscombe, discloses an invention relating to a means for stabilizing the brightness of a projected image on a movable screen. More particularly, the invention relates to a condensing lens system for providing and adjustable illumination angle of a light beam. Using a system of lenses, brightness of the light may be adjusted.

U.S. Pat. No. 4,339,789, issued on Jul. 13, 1982 to Husby et al., discloses a method for quickly, efficiently, and accurately aiming a flood light at a preselected location. The method discloses directing or redirected the collimated radiative output of a low power laser source as a preselected location. The laser output may be aimed at a mirror on the flood light face and reflected directly back to the preselected location or the laser may be temporarily mounted to the flood light and the laser output directed parallel to the flood light beam axis at the preselected location.

U.S. Pat. No. 5,090,805, issued on Feb. 25, 1992 to Stawarz discloses a bow sight apparatus comprising at least one lighted reticle aiming spot which is projected onto a partially reflecting mirror through which the target is viewed so as to superimpose the aiming spot on the target image.

U.S. Pat. No. 5,158,348, issued on Nov. 16, 1990 to Sakamoto and Sasaki, discloses a flood lighting system comprising a flood light having a built-in lamp for lighting a building, a polarizer adapted to linearly polarize radiation from the lamp, and an analyzer disposed in such a manner that its direction of oscillation of light is at right angles with that of the polarizer.

U.S. Pat. No. 5,857,767 issued on Feb. 25, 1997 to Peter Hochstein discloses thermal management system for LED arrays involving a heat sink and LEDs adhesively secured to circuit traces.

U.S. Pat. No. 6,354,714 issued on Mar. 12, 2002 to Michael Rhodes, discloses an embedded LED lighting system for marking flooring, walkways, and roadways.

U.S. Pat. No. 6,361,190 issued on Mar. 26, 2002 to Kevin McDermoott discloses a large surface LED lighting device having an interior reflected disposed and configured to reflect the light emitted by the LED element to increase the divergence of the light and form an interior reflected light. The interior reflector is formed to increase the transfer of heat away from the LED element. The interior reflector is usually disposed in dose proximity to the LED element to maximize the percentage of emitted light it redirects.

U.S. Pat. No. 6,428,189 issued on Aug. 6, 2002 to Peter Hochstein discloses an LED thermal management system wherein an assembly has a heat sink integral with each LED and disposed in thermal contact with a heat dissipater for conveying heat from the LEDs.

U.S. Pat. No. 6,480,389 issued on Nov. 12, 2002 to Shie et al. discloses a heat dissipation structure for a solid-state light emitting device package comprising an LED that includes a heat dissipation structure characterized by having a heat dissipating fluidic coolant filled in a hermetically sealed housing where at least one LED chip mounted on a metallic substrate is dwelled inside. The heat dissipation structure is configured with a metallic wall erected from the metallic substrate, wherein the erected wall surrounds in proximity with the at least one LED chip so that the joule heat generated therefrom may be quickly dissipated, through the heat dissipating fluidic coolant, to the erected wall, and then diffused along the wall down to the metallic substrate which adjoins with a larger external heat sink for draining the heat, thus preventing the at least one LED from overheating.

U.S. Pat. No. 6,517,218 issued on Feb. 11, 2003 to Peter Hochstein discloses an LED integrated heat sink wherein the LED conducts electricity through the heat sink, allowing the diode to be in electrical conductivity with the heat sink.

U.S. Pat. No. 6,561,680 issued on May 13, 2003 to Kelvin Shih discloses a Light emitting diode with thermally conductive structure. Here the LED is designed to be used in conjunction with a heat sink includes an anode portion and a cathode portion formed from a thermally conductive material. The anode and cathode portions have a relatively large surface area to allow efficient heat dissipation.

U.S. Pat. No. 6,567,009 issued on May 20, 2003 to Ohishi et al. discloses a Light Control Type LED lighting equipment, wherein the LED lighting equipment which can be simply perform lighting control of the light by any body and can obtain wide variety of tones in wide range by easy operation.

U.S. Pat. No. 6,573,536 issued on Jun. 3, 2003 to Joel M. Dry, discloses a light emitting diode light source that utilizes light emitting diodes that emit white light is disclosed. The diodes are mounted on an elongate member having at least two surfaces upon which the light emitting diodes are mounted. The elongate member is thermally conductive and is utilized to cool the light emitting diodes. In the illustrative embodiment, the elongate member is a tubular member through which a heat transfer medium flows.

U.S. Pat. No. 6,582,100 issued on Jun. 24, 2003 to Peter Hochstein, discloses an LED mounting system comprising an electrically and thermally conductive heat dissipater sandwiched under an electrically insulating layer with circuit traces disposed over the insulating layer to prevent electrical conduction between the traces and the heat dissipater.

U.S. Pat. No. 6,590,773 issued on Jul. 8, 2003 to Lin discloses a heat dissipation device for enhanced power light emitting diodes, wherein the heat dissipation device is mounted to a light emitting diode device for removing heat from the light emitting diode which includes a substrate having a top side on which a light-emitting unit is formed and an opposite bottom side from which terminals extend. The heat dissipation device includes a plate made of heat conductive material and forming a receptacle for receiving and at least partially enclosing and physically engaging the substrate of the light emitting diode device for enhancing heat removal from the light emitting diode device.

U.S. Pat. No. 6,712,486 issued on Mar. 30, 2004 to Popovich et al., discloses a mounting arrangement for light emitting diodes comprising a heat conductive body portion adapted to conduct heat generated by the LEDs to an adjacent heat sink. As a result, the LEDs are be to be operated with a higher current than normally allowed. Thus, brightness and performance of the LEDs is increased without decreasing the life expectancy of the LEDs. The LED modules can be used in a variety of illumination applications employing one or more modules.

U.S. Pat. No. 6,827,468 issued on Dec. 7, 2004 to Robert Galli, discloses an LED lighting assembly comprising two housing components, namely an inner mounting die and an outer enclosure. The inner and outer components cooperate to retain the LED package, provide electrical and control connections, and provide integral heat sink capacity for the system.

U.S. Pat. No. 6,871,981 issued to Alexanderson et al. on Mar. 29, 2005, discloses an LED lighting device and system comprising a channel case made from a thermally conductive material, including aluminum. A heat transfer device is attached to the bottom of a circuit board and is further attached to the bottom of the channel case. A plurality of light-emitting diodes and resistors are mounted on the circuit board in series and generate light through a lens that is attached to the two opposed side edges of the channel case.

U.S. Pat. No. 6,999,318 issued to Theodore Newby on Feb. 14, 2006 discloses a heatsinking electronic device, wherein the heatsink has a substantially planar upper surface, a wiring board (PWB) with a through-hole for receiving the device such that a principal face thereof is in thermal contact with the heatsink, its electrical leads are captured between at least a portion of the wiring board and the heatsink, and a top of the device protrudes through the PWB.

U.S. Pat. No. 7,044,620 issued to Paul Van Duyn on May 16, 2006, discloses a LED assembly with a reverse circuit board. The lamp assembly comprises a printed circuit board (PCB) having a face surface, a rear surface opposite the face surface, electrical traces on the rear surface, and an opening extending from the face surface to the rear surface, and a LED emitter having a dome portion, a body, and a plurality of electrical terminals connected to the body, wherein the body of the LED emitter is adjacent the rear surface, the dome portion of the LED emitter extends through the opening in the PCB to the face surface, and the electrical terminals are connected to the electrical traces on the rear surface.

U.S. Pat. No. 7,134,768, issued on Nov. 14, 2006 to Nobuyuki Suzuki, discloses a lighting system comprising a plurality of LED light sources that may be introduced into a light guide and inwardly reflected (that is, totally reflected) at a first reflective surface formed on the light guide so as to form a substantially collimated light.

U.S. Pat. No. 7,235,878, issued on Jun. 26, 2007 to Owen et al. discloses a direct cooling system for a LED array wherein coolant directly cools the LED array. Preferably, the coolant may be selected, among other bases, based on its index of refraction relative to the index associated with the semiconductor device.

U.S. Pat. No. 7,420,811, issued on Sep. 2, 2008 to Tsung-Wen Chan discloses a heat sink structure for light-emitting diode based streetlamp that comprises an upper cover, on which heat sink fins are integrally formed, and a lower cover. The heat energy generated by the LEDs mounted within the upper cover and the lower cover can be removed through the heat sink fins, achieving the effect of rapid removal of the heat energy.

U.S. Pat. No. 7,434,964, issued on Oct. 14, 2008 to Zheng et al. discloses a LED lamp adapted for lighting and that comprises a heat sink, a bowl-shaped cover attached to a bottom portion of the heat sink, a lamp seat secured below the cover, a plurality of LEDs mounted on an outside surface of the heat sink, and a plurality of heat pipes contacting with interior face of the heat sink. The heat sink has a plurality of fins extending from sidewalls thereof. The cover has a plurality of apertures defined on lateral wall thereof. The heat generated by the LEDs can be transferred to the heat sink evenly via the heat pipes, and is then dispersed to ambient air efficiently and rapidly.

U.S. Pat. No. 7,513,653, issued on Apr. 7, 2009 to Jun Liu et al. discloses a LED lamp comprising a lamp base, a heat sink mounted on the lamp base and a plurality of LED modules thermally contacting with the heat sink. The lamp base defines a plurality of vents therein. The heat sink includes a central cylinder and a plurality of fins spaced from and surrounding the cylinder. The cylinder defines a through hole therein, which communicates with the vents of the lamp base and cooperates with the vents to form an air passage communicating with ambient air. An included angle is defined between each of the fins and a central axis of the cylinder. The LED modules are mounted on outmost ones of the fins of the heat sink, respectively.

U.S. Pat. No. 7,638,953, issued on Dec. 29, 2009 to Denville discloses a method for applying realtime effects to at least one lighting channel for lighting a fixture.

U.S. Pat. No. 7,654,699, issued on Feb. 2, 2010 to Su-Chi Chang et al., discloses a LED lamp having a heat dissipation structure having a cylindrical center. The cylinder has a through hole therein, which communicates with the inner space and vents of the lamp base and cooperates therewith to form an air passage. The LED modules are attached to a periphery of the heat sink. The blower generates an airflow circulating through the air passage to thereby dissipate heat generated by the LED modules.

U.S. Pat. No. 7,744,247, issued on Jun. 29, 2010 to Wen-Xiang Zhang et al. discloses a LED lamp having double-side heat sink.

U.S. Pat. No. 7,753,544, issued on Jul. 13, 2010 to Hirofumi Ohta et al., discloses a light source and light control plate positioned in front thereof, such that the surface light source emits, in a predetermined direction, parallel light having a substantially uniform luminance distribution.

U.S. Pat. No. 7,753,556, issued on Jul. 13, 2010 to Wen-Xiang Zhang discloses a compact LED lamp having a heat dissipation structure comprising a heat sink cover comprising a plate and a plurality of fins formed on a top surface thereof.

U.S. Pat. No. 7,784,955, issued Aug. 31, 2010 to Choi et al., discloses a LED headlamp aiming apparatus, which is disclosed to aim a mounting module provided with LEDs and installed in a headlamp housing.

U.S. Pat. No. 7,784,972, issued on Aug. 31, 2010 to Heffington et al. discloses a thermal management system for a LED array U.S. Pat. No. 7,789,528, issued on Sep. 7, 2010 to Ci-Jin Mo and Li He, discloses an outdoor LED lamp having a protective cover mounted on the LED lamp and covering a heat sink of the LED lamp therein. The LED lamp includes a bracket, the heat sink mounted on a top side of the bracket, and a plurality of LED modules mounted on a bottom surface of the heat sink. The cover is used for preventing snow, leaves or dust from accumulating on the heat sink.

U.S. Pat. No. 7,800,909, issued on Sep. 21, 2010 to Tsung-Ting Sun discloses a lamp base having a heat sink. The heat sink comprises a heat-dissipating base formed with a trough for accommodating the bulb therein.

U.S. Pat. No. 7,819,556, issued on Oct. 26, 2010 to Heffington et al. discloses a thermal management system for LED array comprising a chamber having a liquid disposed therein, a LED array having a first surface which is in contact with said liquid, and at last one actuator adapted to dislodge vapor bubbles from said first surface through the emission of pressure vibrations.

U.S. Pat. No. 7,868,305 to Atul Gupta, issued Jan. 11, 2011, discloses a technique for ion beam angle spread control. In one embodiment, the technique is disclosed as a method for ion beam angle spread control comprising one or more ion beams aimed as a substrate surface at two or more different incident angles.

U.S. Pat. No. 7,874,701, issued on Jan. 25, 2011 to Rudy Pohlet et al. comprises a lighting apparatus having a panel frame and a plurality of LEDs or other light elements secured thereto. Lenses and/or filters are adjusted in distance from the light elements, by positioning the and repositioning the lenses or filters into different slot positions of the frame, thereby altering the characteristics of the emitted light.

U.S. Pat. No. 7,884,896, issued on Feb. 8, 2011 to Sang-Jun Park discloses a light-guide plate comprising an incident surface, an emissive surface, and a reflective surface. The incident surface further comprises a plurality of light-control patters formed in sectioned regions of the incident surface.

US Patent Publication No. 2005/0084229 A1, published on published on Oct. 18, 2004 to Victor Babbitt et al. discloses a system wherein a light source (preferably LEDs) injects light into a translucent light guide. The core to the light guide comprises a homogenous mixture of fluid and a light dispersing agent to effect scattering. In this system, scattered light passes through the light guide and may be used for illumination.

US Patent Publication No. 2005/0242734 A1, published on Nov. 3, 2005 to Fredric Maxik to Victor Babbitt et al. discloses an improved light bulb exhibiting a wide angle dispersed light which uses, as a source of light dispersion, crystalline particular material incorporate into the molded or formed material of the light bulb.

US Patent Publication No. 2006/0012984 A1, published on Jan. 19, 2006 to Coushaine et al. discloses a LED lamp assembly formed from a support plate comprising a first and second side, and wherein a plurality of LED light sources are arranged and mounted on the first side of the support plate, and an axially extending, light transmissive, light guide.

US Patent Publication No. 2006/0227546 A1, published on Oct. 12, 2006 to Yeo et al., discloses an enhanced light fixture containing a volumetric, anisotropic diffuser to control the spatial luminance uniformity and angular speed of light from the light fixture. The anisotropic diffuser contains one or more regions of asymmetrically shaped light scattering particles. The spread of illumination of light from a light emitting source can be efficiently controlled by using a thin, low cost, volumetric, asymmetric diffuser to direct the light in the desired direction. This allows the reduction in number of light sources, a reduction in power requirements, or a more tailored illumination.

US Patent Publication No. 2006/0180821 A1, published on Aug. 17, 2006 to Xue-Jan Fan discloses a Light-emitting diode thermal management system comprising a channel beneath a trace layer and above a heat sink, the channel designed to transfer to the heat sink any heat applied to the trace layer by the LED.

US Patent Publication No. 2007/0258247 A1, published on Nov. 8, 2007 to Park et al. discloses a light-emitting module that allows a display panel to be made thinner. The light emitting module comprises a point-light source and an optical cap. The point-light source is disposed on a substrate. The optical cap surrounds a side portion and an upper portion of the point-light source and has a first embossing pattern formed thereon. Light is emitted from the point-light source and passes through the optical cap to be diffused, for example by the first embossing pattern. Thus, extra components such as a diffusing plate, a diffusing sheet, etc., may be omitted from the display device, and the display device may be slimmer.

US Patent Publication No. 2008/0055900 A1 published on Mar. 6, 2008 discloses a LED light pod with modular optics and heat dissipation structure. A reflective optic plate, which may be made in various modular sizes and designs, having a plurality of recesses is seated on a LED board having a plurality of LEDs, such that the plurality of LEDs fit within the plurality optical recesses. The optical recesses serve to collimate light in a desirable manner based on predetermined dimensional ratios of the optical recesses. A heat dissipation system involves a heat sink housing acting in combination with a heat extraction plate having a plurality thermally conductive posts extending perpendicularly from a top and bottom surface, and a heat dissipation plate to create a thermally conductive path for moving heat away from the LED board when the light pod is in use.

US Patent Publication No. 2008/0149305 A1 published on Jun. 26, 2008 to Te-Chung Chen discloses a Heat Sink Structure for High Power LED Lamp comprising a heat conducting lamp holder, a heat conductor and a heat sink. The heat conducting lamp holder is made of highly heat-conductive material to provide a smooth surface for firmly holding a LED lamp. The heat conductor is made of highly heat-conductive material for linking the heat conducting lamp holder and the heat sink. The heat sink includes a plurality of heat sink fins made of highly heat-conductive material. The plurality of heat sink fins are arranged radially to form a porous center structure with no occluding junction, thereby implementing a heat sink structure which can provide omnidirectional heat dissipating capability and good convection capability to let hot air to rise naturally for high power LED lamps.

US Patent Publication No. 2008/0185969 A1, published on Aug. 7, 2008 to Klaas Vegter et al. discloses a lighting system comprising a controller, lighting units, and a sensing device. Each lighting unit comprises a lighting source and a modulated light source.

US Patent Publication No. 2010/0059592 A1, published on Mar. 11, 2010 to Stefano Barsotti discloses an aiming device for an image acquisition apparatus, the aiming device comprising a light emitting means and a light guide arrange for receiving luminous radiation generated by the light emitting means and for providing a reference image means at an aiming zone.

US Patent Publication No. 2010/0128473 A1, published on May 27, 2010 to Roland Parra discloses a quiet LED fixture that adjusts between a neutral, flood, and spot array configuration.

US Patent Publication No. 2010/0027085 A1, published on Feb. 4, 2010 to Anthony Gatalano discloses a lighting device having an adjustable beam, the beam being adjustable through the use of a hologram diffuser comprising areas of differing diffusing properties. The adjustable beam involves the use of a hologram diffuser with areas that have different diffusing properties. The different diffusing areas are selectively positionable in a light beam created by the lighting device to provide for an adjustable beam by providing different diffusions of the light.

US Patent Publication No. 2010/0213835 A1, published on Aug. 26, 2010 to Anthony Mo et al. discloses a lighting system comprising at least one point source of light which emits a beam, and at least one reflective means for diffusing the light and/or converting the light to a different color range.

U.S. Design Pat. No. D626519, issued on Nov. 2, 2010 to Pei-Chih Yao, is a design patent that discloses a heat dissipation module for a streetlamp.

Each of these prior art systems suffers from one or more of the following limitations, problems, or shortfalls: requiring the use of LED drivers which are bulky, expensive, create waste heat, lower efficiency, and increase complexity; lacking active cooling; lacking passive cooling; lacking efficient cooling systems; being susceptible to solar heating; lacking cooling on both sides of the LEDs; being heavy; being bulky; being expensive; being of limited scale and brightness; having low watt equivalence; suffering from excessive flicker; providing no control of the shape of the area lit; not being dimmable; requiring a warm-up time; and causing light pollution.

In view of the foregoing disadvantages inherent to the prior art LED lighting systems it is a first objective of the invention to provide an LED lighting system having a wiring scheme that does not require LED drivers, but instead employs a simple step down transformer or mechanism, and that minimizes flicker.

It is a second object of the invention to provide an LED lighting system with passive cooling to both the front and back of the individual LEDs.

It is a third object of the invention to provide a multi-phasing board technology that minimizes flicker in an LED electrically connected thereto.

It is an fourth object of the invention to provide an LED lighting system that may be configured for custom shaped lit areas and for custom designed illumination patterns utilizing a front plate having beveled areas ranging of range from greater than zero to 120 degrees.

It is a fifth object of the invention to provide an LED lighting system that remains continuously operational while maintaining a temperature of about 15 degrees above an ambient temperature around the system.

It is a sixth object of the invention to provide an LED lighting system having an integrated curvature building into the light guide such that the spread of available customized configurations for directing light output is maximized.

It is a seventh object of the invention to provide an LED lighting system that with increased energy efficient beyond conventional LED lighting systems.

It is an eighth object of the invention to provide an LED lighting system exhibiting highly directed light output so as to minimize light pollution.

It is a ninth object of the invention to provide an active cooling system for an LED lighting system.

It is a tenth object of the invention to provide a heat reduction component for an LED lighting system that also functions as a customizable lens for the LED lighting system It is an eleventh object of the invention to provide an LED lighting system that compatible with conventional dimmer switches.

It is a twelfth object of the invention to provide an LED lighting system which is easily scalable from low wattage equivalent configurations to high wattage equivalent configurations, such as 36 kW.

It is thirteenth object of the invention to provide an LED lighting system that minimizes the effecting of solar heating and to be combinable with solar technology for further customization.

It is a fourteenth object of the invention to have interchangeable angles of diode light throw to maximize spread customization.

It is a fifteenth object of the invention to provide an LED lighting system with an ability to customize the shape and illumination patterns emitted therefrom.

It is a sixteenth object of the invention to minimize physical contact between an LED lighting system and an enclosure for said system.

It is a seventeenth object of the invention to provide an LED lighting system that does not require a warm-up period.

Additional objects and advantages of the present invention will become obvious to the reader and it is intended that these objects and advantages be within the scope of the present invention.

SUMMARY OF THE INVENTION

In its preferred embodiment the present invention relates to an LED lighting system including a heat sink within improved thermal diffusion attributes. More specifically, the invention in its preferred form is an improved heat reduction structure for an LED-based indoor and outdoor lighting apparatus, the improved heat reduction structure simultaneously functioning as a customizable lens.

The present invention further comprises an improved circuit design for an LED based lighting apparatus, in which the improved circuit design operates in the absence of LED drivers and is structured to minimize flicker and power use of the LED lighting system.

The LED lighting apparatus may be further described to comprise a plurality of LEDs, a power source configured to provide AC power having a first ½ cycle and a second ½ cycle, a first and second electrical circuit, wherein said first circuit is continuous with said power source and a first half of said plurality of LEDs and configured to light said first half of said plurality of LEDs during said first ½ cycle, and wherein said second circuit is continuous with said power source and a second half of said plurality of LEDs and configured to light said second half of said plurality of LEDs during said second ½ cycle. Optionally each of said first half of said plurality of LEDs is adjacent to one or more LEDs within said second half of said plurality of LEDs. Optionally each of said first half of said plurality of LEDs is within $13/16^{th}$ of an inch of one or more LEDs within said second half of said plurality of LEDs.

The LED lighting apparatus may be further described to comprise a plurality of LEDs, a faceplate comprising a beveled aperture through said faceplate directly above each LED, a power source, and a heat dissipation component configured to draw heat from the back of said LEDs and exude it through an enclosure.

BRIEF DESCRIPTION OF THE FIGURES

The foregoing aspects and many of the attendant advantages of the invention will become more readily appreciated as the same becomes better understood by reference to the following detailed description, when taken in conjunction with the accompanying drawings, wherein:

FIG. 7 depicts a various embodiments of the LED lighting system, each with differently arranged beveled holes and differently arranged LEDs in order to achieve differing lighting patterns and intensity;

FIG. 9 shows two tables of data collected during field-testing performed on a 1 kW LED lighting system;

FIG. 10 shows a diagrammatic view of the state of LEDs during two cycles of power in an embodiment of the present invention and wherein powered LEDs are indicated by a small white circle and unpowered LEDs are indicated by the absence of a small white circle;

FIG. 11 shows a diagrammatic view of the state of LEDs during two cycles of power in an embodiment of the present invention and wherein powered LEDs are indicated by a small white circle and unpowered LEDs are indicated by the absence of a small white circle;

DETAILED DESCRIPTION OF THE INVENTION

The present application presents an improved LED lighting system. The improved LED lighting system functions without LED drivers and offers improved efficiency and efficacy relative to the prior art. The system further comprises passive thermal diffusion structures, and optionally, active thermal diffusion means.

Figure 1:
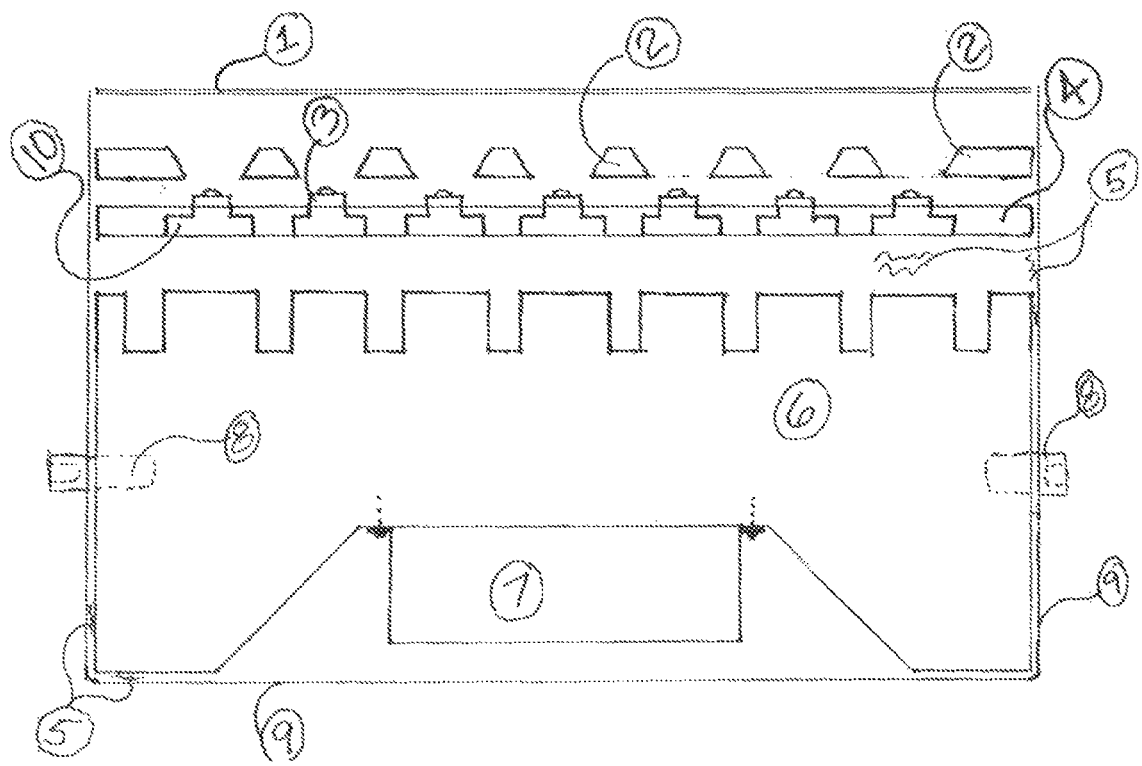
FIG. 1 depicts a cross sectional view of the LED lighting system according to a preferred embodiment of the invention.

Turing first to FIG. 1, a cross-sectional diagrammatic side view of a preferred embodiment of the improved LED lighting system is shown. In this preferred embodiment the LED lighting system may be installed in a standard light fixture housing 9, such as but not limited to those in use indoors and outdoors, with some example outdoor uses including stadiums, flood lights, green house lights, and parking lot lights. The device preferably comprises a one-piece light guide faceplate coupled with a transformer, both housed within a housing having a rounded cover to provide protection from the elements when the device is used outdoors. The rounded cover is removable thereby allowing the fixture to be used with both indoor and outdoor applications. The device comprises a printed circuit board or printed wiring board (PWB) (not shown) comprising a plurality of LED dies 3, which in a preferred embodiment are high intensity LEDs. The number of dies present is preferably at least 4, but in alternative embodiments may be as few as one. In one embodiment equivalent to a 36 kW lighting system, the LEDs are be present on a panel having a size of 36 inches×36 inches. The plurality of LED dies 3 are mounted at an LED backside (not labeled) to custom thermal LED footprints 10 that are themselves mounted on a dual purpose custom footprint 4 that provides electrical connectivity and heat management. The plurality of LED dies 3, thermal LED footprints 10, dual purpose footprint and faceplate may be made of any metallic or conductive element. The faceplate may in an alternative embodiment be plastic. The travels and footprints on the PWB are preferably copper and are HASL (hot-air solder leveled) coated with liquid lead free solder. The heat transfer components are preferably any material used for the conduction of heat and for passively dissipating heat into surrounding air. While the most preferred material is an aluminum alloy, but copper and composite materials such as copper-tungsten pseudoalloy, silicon carbide in an aluminum matrix, and beryllium oxide in a beryllium matrix may be used.

Figure 5:
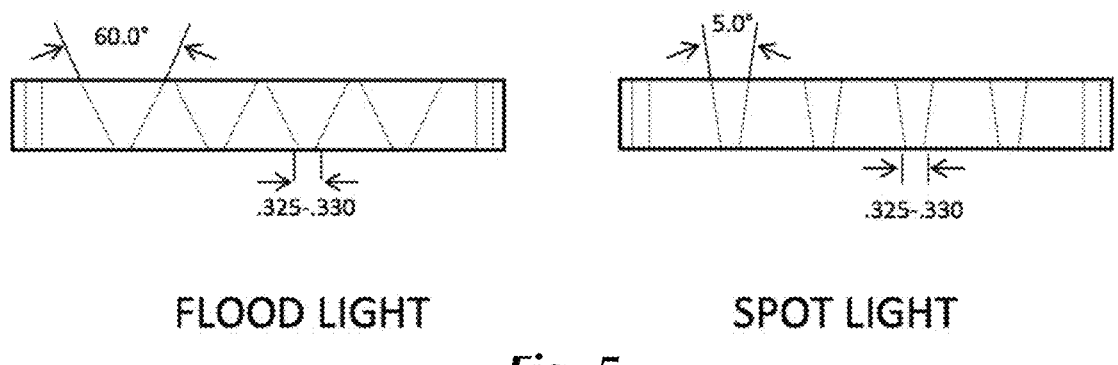
FIG. 5 depicts a cross-sectional view of the one-piece light guide faceplate of the LED lighting system according to a preferred embodiment of the invention.
Figure 6:
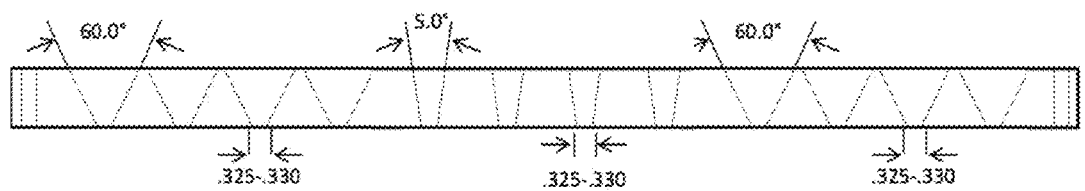
FIG. 6 depicts a cross-sectional view of the one-piece light guide faceplate of the LED lighting system according to an alternative embodiment of the invention.

Located above and in contact with the LED dies/footprints is the one-piece light guide faceplate. The light guide faceplate, in a preferred embodiment, comprises a plurality of 15-60 degree beveled holes, each of said plurality situated above each said plurality of LEDs 3. FIG. 5 depicts one diagrammatic view of angles that may be used to form either a flood light or a spot light. Other angles are possible as well, both up to and including 120 degrees and down to a range very close to zero degrees for very concentrated light. The bevel angle in the plurality of beveled holes need not necessarily be equal across all beveled holes. For instance, certain lighting effects may be created when some number of the beveled holes comprise bevels of a first angle and a portion of the beveled holes comprise bevels of a second angle, as shown in FIG. 6. In that example, a combination spotlight and flood light is created, wherein the center beveled holes are of an angle to concentrate more light in the center of the illuminated area. Additional angles are possible as well. This light guide faceplate is preferably made up from a single piece of aluminum, with the beveled holes extending there through. In alternative embodiments the aluminum may be of a honey cone type structure that is flexible and remains very cool. Other materials used for the dissipation of heat into air may be used, as detailed above. Preferably the light guide faceplate is polished, however, in an alternative embodiment of the invention the light guide faceplate is non-polished. As shown in FIG. 5, in a preferred embodiment these holes are approximately 0.325-0.330 inches in diameter at their narrowest end (the bottom end), and become wider at the bevel angle at a positions more proximate the front of the light guide faceplate. In alternative embodiments the holes may have larger or smaller minimum diameters.

The polished beveled holes in the light guide faceplate act as a lens to focus and direct the light emitted from each LED. Preferably, there is one beveled hole for each LED. Although in the preferred embodiment the bevel angle is between 15 and 60 degrees, In alternative embodiments the bevel angle may be any of between 0-120 degrees. While in the preferred embodiment the light guide faceplate is between $\frac{1}{8}^{th}$ inch and 2 inches thick, in alternative embodiments the light guide faceplate may be thinner than $\frac{1}{8}^{th}$ inch or thicker than 2 inches.

Continuing with FIG. 5, a distance of 0.325-0.330 inches is shown. This is an optimum and preferred range of distance between LEDs to prevent loss of light and to optimize the light projection. These numbers are based off the distance between each of the LEDs in the system, and are designed to "hug" each LED. In other embodiments where larger or smaller LEDs may be used this distance may be forced to be larger, but preferably a maximum distance of 0.330 inches is not exceeded. Less preferably, a maximum distance not to exceed 0.500 inches is used.

The light guide faceplate, in addition to providing light focusing and guiding through its beveled holes, dually comprises a heat sink component to assist with thermal diffusion of heat generated by the plurality of LEDs 3 positioned therein. To assist with thermal diffusion, the light guide faceplate is disposed in thermal contact with the plurality of LED dies 3 and thermal LED footprints 10 such that the light guide faceplate acts as a heat sink and heat dissipater to the heat generated by the plurality of LEDs 3. Preferably, direct thermal contact between the LED dies 3 and the heat sink does not occur, but instead the contact between the light guide faceplate and the LED dies/footprints and the light guide faceplate is mediated by a thermally conductive intermediary as known in the art, such as thermal grease or paste, or dielectric gel.

While the precise thickness and size of heat sink is dependent on the power demands of each of the plurality of LED dies 3 and the number of LED dies, preferably the heat sink is as thin as $\frac{1}{8}^{th}$ inch (if only one LED is used) and as thick as five inches.

In the preferred embodiment the front of the housing 9 further comprises a glass panel, the glass panel further comprising (in an alternative embodiment) a microfilm 1. In an alternative embodiment of the invention where the housing does not comprise a glass panel, a microfilm may still be optionally disposed above the LEDs. The microfilm 1 is of any suitable type known in the art for providing light dispersion (i.e. 0-60 degrees dispersion), light coloration, a stencil to give the projected light a shape such as a square or a star, or other uses as known in the art. In one embodiment the microfilm is a interference filter such as a dichroic filter.

Positioned behind the custom footprint 4 is a custom heat transfer module 6. Custom heat transfer module 6 serves to cool the plurality of LED dies 3 and increase their useful lifetime. The heat transfer module 6 preferably contacts a backside of the plurality of LED dies 3 and/or the thermal LED footprints 10 on the back of the LED via a thermally conductive intermediary 5 such as dielectric gel or thermal grease. Heat transfer module 6 is preferably of a thickness between $\frac{1}{8}^{th}$ inch and 4 or more inches. The thickness is dependent on the number of LEDs used in the system, with more LEDs requiring greater thickness and hence greater thermal diffusion properties. In very small or very large applications, the thickness of the heat transfer module 6 may exceed 4 inches or be under $\frac{1}{8}^{th}$ inch. Heat transfer module 6 may comprise groves, channels or other features to promote airflow. Further, the heat transfer module 6 is in contact with the light fixture housing 10 at limited locations, and this contact is preferably mediated by a thermally conductive intermediary 5 as known in the art such as dielectric gel, or thermal grease. The passive cooling described is with regard to the heat sink and solar cooling. In solar cooling, in order to reduce the effect of solar heating on the LED lighting system, the heat transfer module 6 is not in contact the housing at specified locations. At those locations, there is thus provided a layer of insulating air, reducing solar heat transfer to the rest of the system. The system may also comprise active cooling means, such electrically powered fans to blow air across components in the system that may require additional cooling.

In a preferred embodiment the heat transfer module 6 is attached to the housing 10 by double-headed screws 8 which may serve as attachment points for an external solar panel, which may simultaneously provide power and cooling.

The effect of the passive and active heat dissipation components present in the applicant's improved LED lighting system are exhibited when the device is in use, wherein the system exhibits improved heat characteristics relative to prior art systems. In one exemplary embodiment, an LED lighting system configured to provide 1,000 W equivalent light and during tested was operational for over one year continuously, and during that time not exceeding a steady state of approximately 15 degrees above ambient temperatures. Because the system components are not regularly subjected to wide temperature variances during operation and nonoperation, the useful lifespan of the system is increased.

To further increase efficiency, the Applicant's improved LED lighting system preferably comprises a transformer 7. Unlike prior art systems, which require the use of LED drivers, the current system employs a simple step-down transformer that reduces the voltage of the incoming AC power but does not rectify or otherwise transform the incoming power. The LED system may draw power from standard 120 v AC power, from 240 v AC power, or from any other AC power distribution standard.

Figure 3:
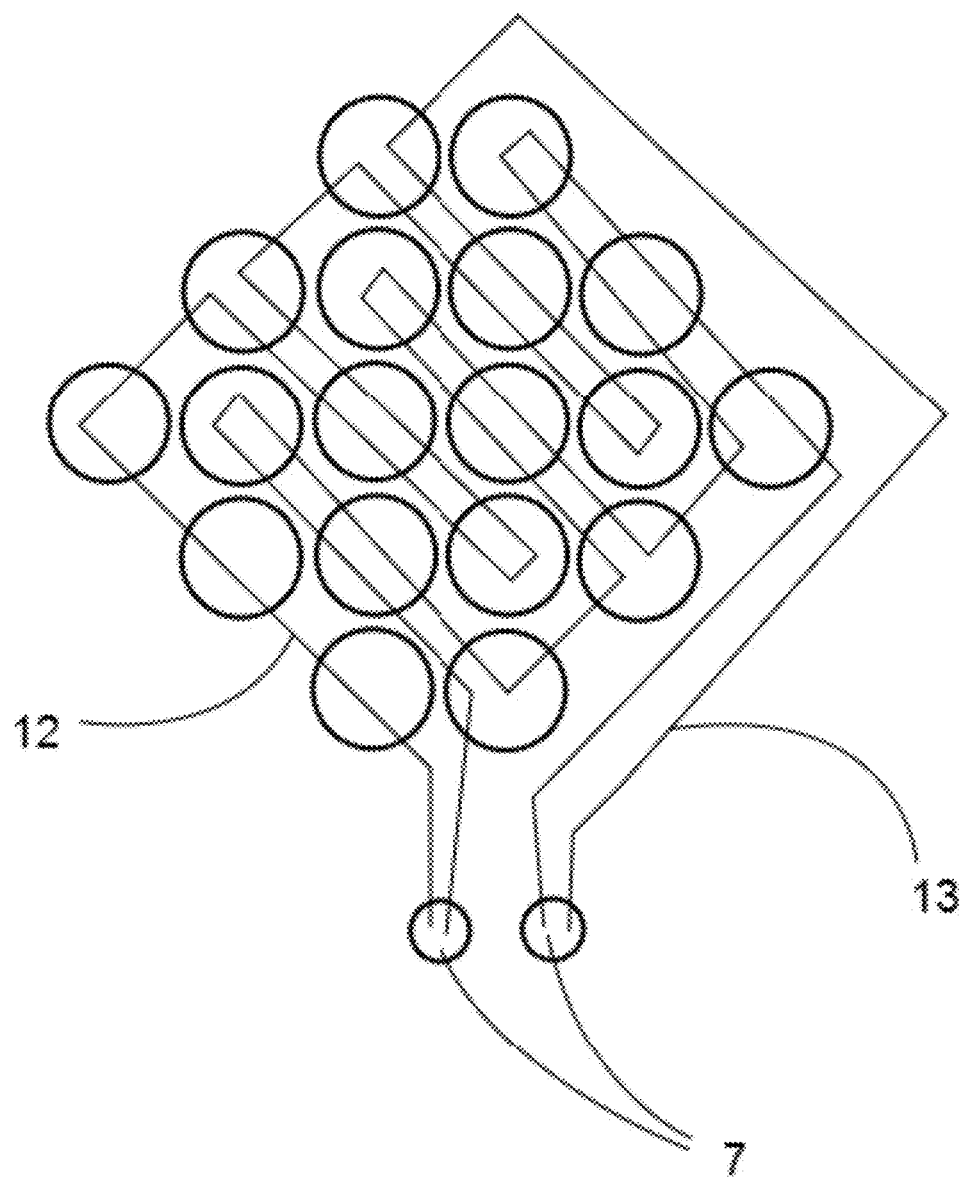
FIG. 3 depicts a simplified circuit diagram of the LED lighting system according to the preferred embodiment of the invention.

Turning to FIG. 3, a diagrammatic top view of the LED lighting system illustrating an exemplary embodiment of the wiring of the LEDs is shown. This novel LED-wiring arrangement allows the LED lighting system to employ a simple step-down transformer. As depicted in this exemplary embodiment, there are two independent circuit paths 12 and 13 running through the LEDs from the two terminals of transformer 7. Due to the nature of LEDs, they are only illuminated when voltage is applied in one of two directions across the LED. By way of illustration, when the LED lighting system is energized, the step-down transformer 7 reduces the voltage from, for example, a household 120 v AC line operating at 60 Hz. During the first ½ power cycle (the first 1/120th of a second) the LEDs along circuit path 12 will light while those on circuit path 13 will remain unlit. During the second ½ power cycle (the second 1/120th of a second) the LEDs along circuit path 13 will light while those on circuit path 12 will be unlit. Due to the layout of the LEDs and the circuit paths, when one LED is unlit an adjacent LED (or several) will be lit. Preferably, alternating LEDs are adjacent to one another shown in FIGS. 10 and 11, such that at any given time the LEDs adjacent to one LED that is on will all be off, and adjacent LEDs next to any one LED is on will all be off. In FIGS. 10 and 11 the image on the left shows the state of the LEDs at first moment in time in the cycle and the image on the right shows the state of the LEDs at a second moment in time in the cycle. As is readily apparent, the LEDs that are dark during the moment in the cycle are illuminated at the second moment and vice first. Also readily apparent, no adjacent LEDs are illuminated. Due to the close spacing of the LEDs the human visual system will not register the rapid on-off cycle of each LED and instead the light output is interpreted as continuous light emanating from the LED lighting system. In a preferred embodiment circuit paths 12 and 13 are configured such that ½ of the LEDs are lit during each ½ power cycle.

The ability to use a simple step-down transformer greatly simplifies the LED lighting system relative to the prior art, which generally require the use of LED drivers, with the downsides of increased complexity, weight, and energy loss. This simplified power solution allows the LED lighting system to be much lighter, smaller, and more efficient than prior art systems. For instance, an exemplary 1000 W equivalent embodiment of the present invention weighs a mere 4-7.5 pounds, comparable to 35-50 pounds for conventional lights of the same output. The wattage drawn may vary beyond the range given, but is preferably between 12-48 watts of power, vs. 1000 watts for conventional equivalents. In other embodiments a replacement system for a 125 watt system may run at less than 10 watts on a 120V system, a replacement system for a 250 watt system may run at less than 12 watts on a 120V system, a replacement system for a 500 watt system may run at approximately 12 watts on a 120V system, a 1 kW replacement system may run at 24 watts on a 120V system, a 2 kW replacement system may run at approximately 48 watts on a 120V system, and a 4 kW replacement system may run at 96 watts on a 120V system.

As detailed above, the improved LED lighting system comprises a housing further comprising the light guide faceplate and transformer. In a preferred embodiment of the invention the transformer has a thickness of approximately 2 inches, although the exact thickness is dependent on the voltage difference of the electricity being transformed and the physical requirements of each installation.

Figure 2:
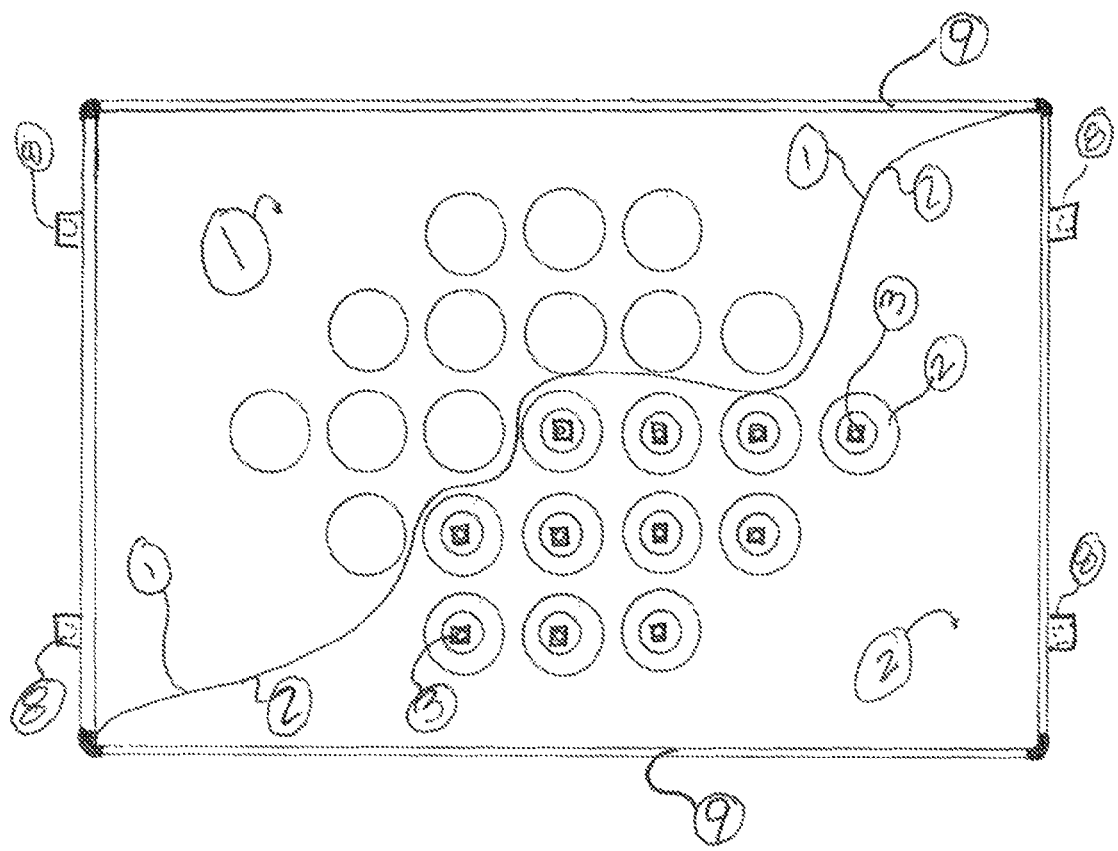
FIG. 2 depicts a top view of the LED lighting system according to the preferred embodiment of the invention.

Turning to FIG. 2, a diagrammatic top down view of the improved LED lighting system according to preferred embodiment is shown. As shown, the plurality of the LED dies 3 and the associated beveled holes are arranged in close-set pattern. In a preferred embodiment the distance between each of the plurality of LED dies 3, center-to-center, does not exceed 0.330 inches. In less preferred embodiments the distance does not exceed 0.500 inches. When the LEDs are spaced farther apart than this distance, flicker in the LED lighting systems appears more prominent to an observer, even when adjacent LEDs are alternatively on and off, as described above. The bevel angle and distance between spacing of each of the plurality of LED dies 3 in the preferred embodiment is optimized so as to not cause a loss of light due to beam crossing and light confusion, wherein light is lost due to the premature crossing of photons.

Thus, the optimum configuration comprises fully developed bevel angles (that is, the bevels are as shown in attached figures, exhibiting no overlap even partially through the bevel cut, and no light seeping into the path of other LEDs before light fully leaves the faceplate) that provide maximum light output with minimum visible flicker. If light is able to cross into an be accepted by a die lens, then the LED die will actually produce, rather that consume, power, in the same way as a photovoltaic cell. While solar cells are generally made with a large area PN junction, an LED only has a small surface area in comparison, and hence the power produced is proportionally smaller.

Figure 4:
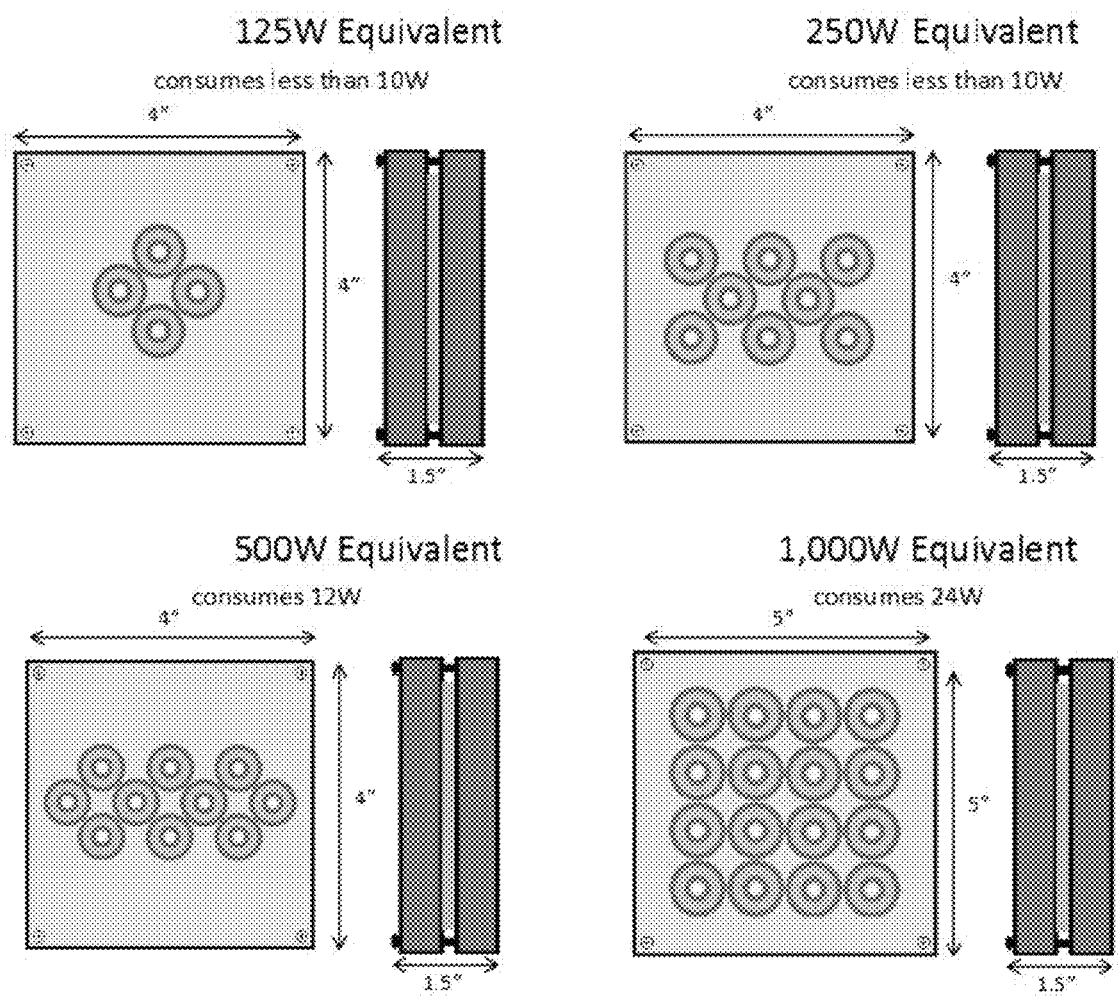
FIG. 4 depicts various embodiments of the LED lighting system, each of a different size and brightness.

Many patterns of LEDs and beveled holes may possible, some of which are shown in FIGS. 4, 5, and 7. Various configurations of LEDs and beveled holes may be employed to achieve various lighting effects, variously shaped lit areas, and various light intensity patterns, such as those shown in FIG. 7. Different bevel angles may be employed and mixed in varying patterns in a single LED lighting system in order to achieve an assortment of lighting effects, differently shaped lit areas, and different light intensity patterns.

Continuing on with FIG. 7, the top left image shows a system with eight LEDs, and wherein the beveling angle is 5 degrees for the central four and 60 degrees for the outer four, yielding a focal point spot light with a flared flood light around it. At top right, a system with 10 LEDs is shown wherein the central four LEDs' light is directed through a beveled angle of 60 degrees and the outer six LEDs' light is directed through a beveled angle of 15 degrees, yielding a setup that is effective for lighting narrow walkways from a medium distance away. At middle left is a system with 16 LEDs, and wherein the light from the central four is directed through a beveled angle of 60 degrees and the light from the outer 12 is directed through beveled holes having an angle of 5 degrees. At middle right is another system with 16 LEDs, only here the light from the central four LEDs is directed through 15 degree beveled holes and the light form the outer 12 LEDs is directed through 45 degree beveled holes. The middle left system is generally used for focused spot lighting in on-stage lighting, and the middle right system is generally used for lighting signs placed on the outside top portion of buildings. The bottom systems are a large scale systems and equivalent to a 36 kW traditional light solutions. At bottom left, the light from the middle 64 LEDs is directed through 5 degree beveled holes, the light from the surrounding 192 LEDs is directed through 15 degree beveled holes, while the light from the outermost 320 LEDs is directed through 60 degree beveled holes, yielding a system generally used for lighting large areas such as mountains. Finally, at bottom right a system is shown generally used for focused tunnel and spot lighting over a long distance, typically for outdoor performances or mega-searchlights. Here, the light from the middle 64 LEDs is directed through 60 degree beveled holes, the light from the surrounding 192 LEDs is directed through 15 degree beveled holes, while the light from the outermost 320 LEDs is directed through 5 degree beveled holes In a preferred embodiment of the invention the color of the LEDs is cool, at between 5000K and 6500K color temperature, however LEDs outputting a wide spectrum of color temperatures may be employed to achieve various lighting or spectrum effects. For instance, outdoor and natural coloring of 4000K-5000K and warm coloring of 2000K-4000K are available, as well as color temperatures exceeding 6500K. Further, in certain embodiments the plurality of LEDs may not all be one uniform color, but instead may be made up of LEDs having at least two colors, and in some instances many more. In some of these embodiments, only LEDs of one color are activate at any given time. In an exemplary case, the device may comprise a plurality of LEDs, where a portion illuminate to a first color and the remaining portion illuminate to a second color. When those LEDs of the first color are illuminated the LEDs of the second color are not, and when the LEDs of the second color are illuminated the LEDs of the first color are not.

The system may also be used to provide light for photosynthesis in plants. While the color of lamp used depends on the age of the plant or vegetable, the stage of the life cycle of the plant, and growth limit restrictions, in one embodiment, grow lamps of approximately bright daylight (5000K color temperature) are used. In other examples, the system may produce light described as cool (5,000K-6,500K), natural (4,000K-5,000K, and warm (2,000K-4,000K). When used with the optional microfilm 1, the system offers a wide availability of color options. It is noted that lighting systems employing the Applicant's technology also tend to attract fewer insects, which is generally a nuisance associated with outdoor lighting applications. Fewer insects are attracted to the Applicant's system because there is so little heat output. This effect may be amplified through use of a yellow-tinted light source, which is a color difficult for most insects to detect.

Figure 12:
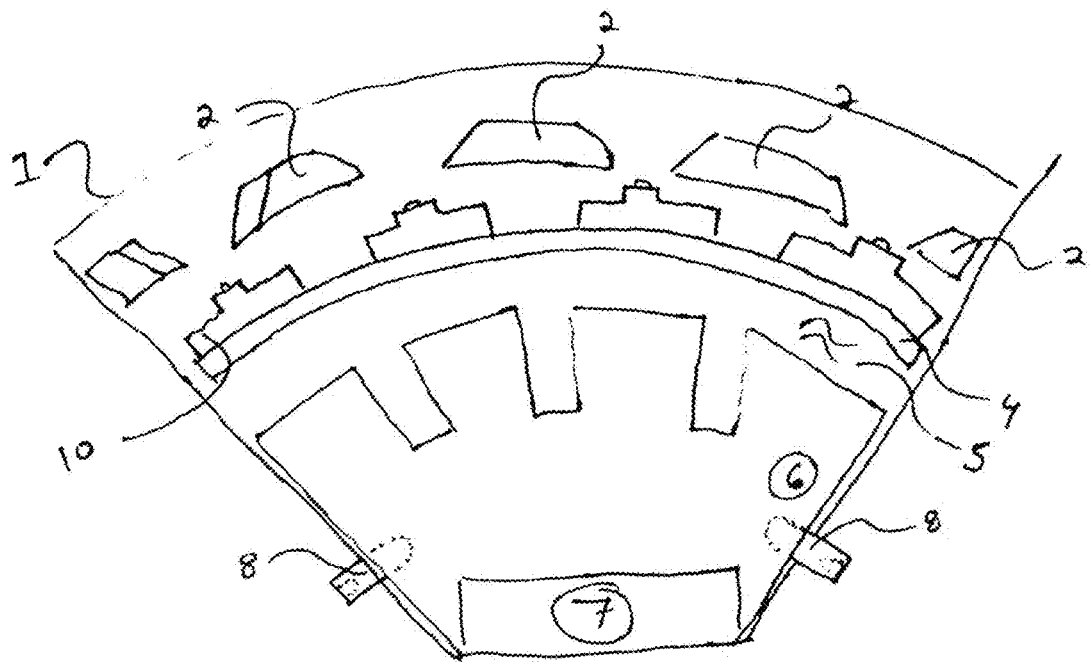
FIG. 12 depicts a cross sectional view of the LED lighting system according to an alternative embodiment of the invention.
Figure 13:
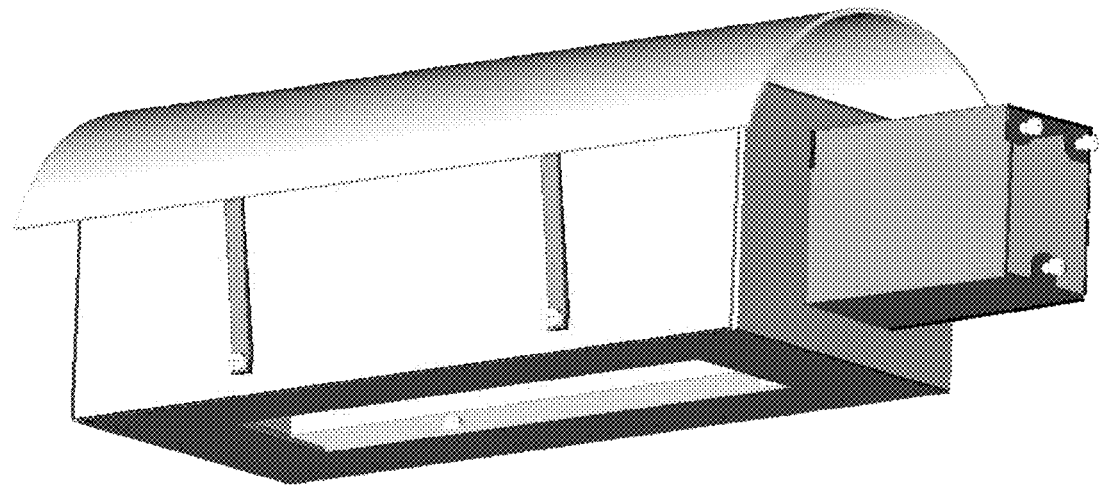
FIG. 13 depicts a perspective view of the lighting system according to the preferred embodiment of the invention.
Figure 14:
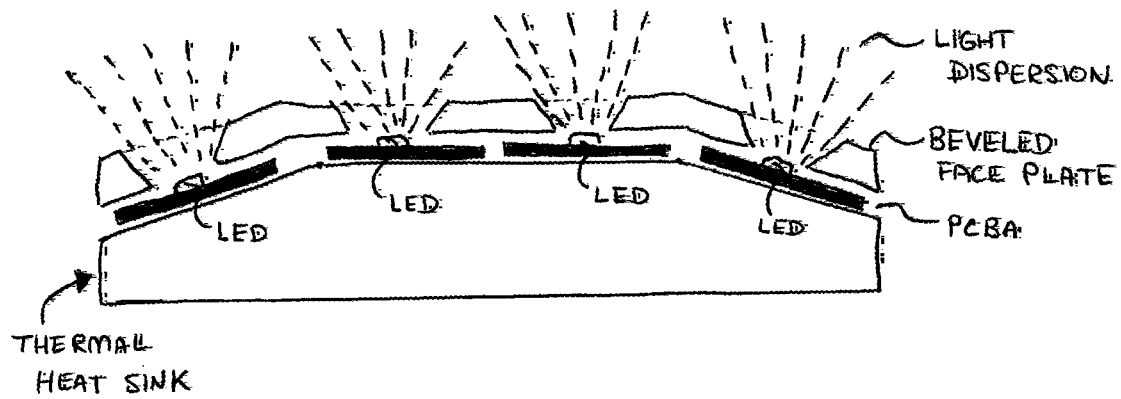
FIG. 14 depicts a cross sectional view of the LED lighting system according to an alternative embodiment of the invention wherein one of a plurality of rows of LEDs is depicted.
Figure 15:
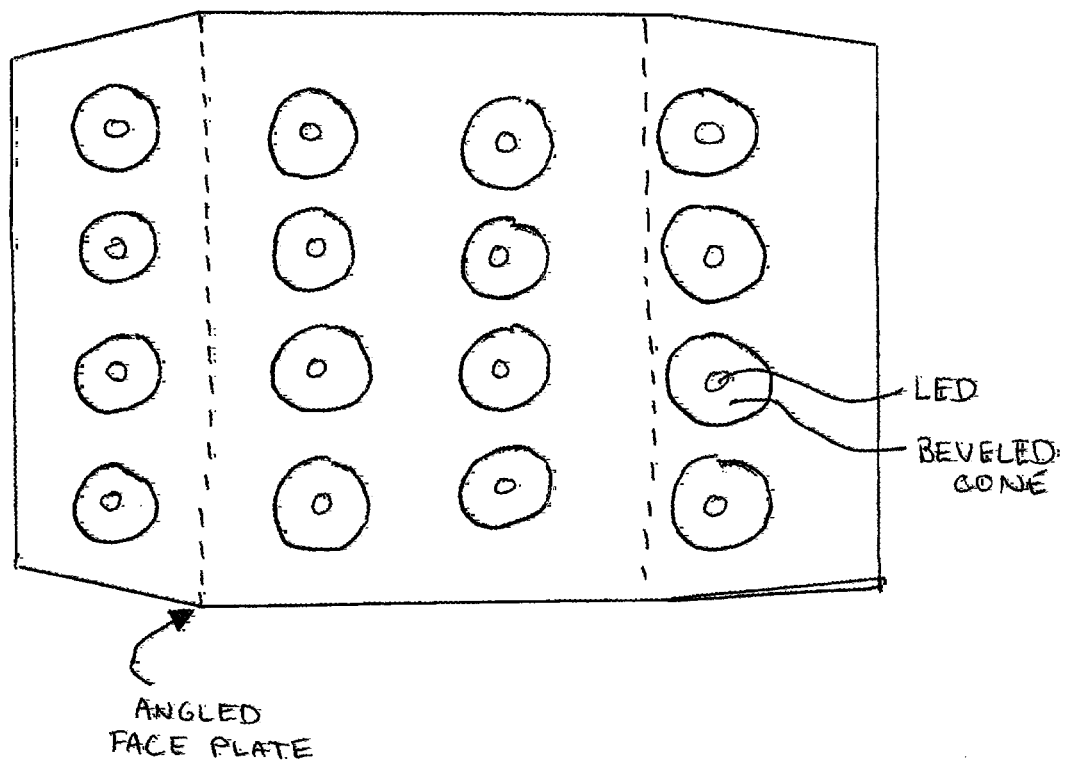
FIG. 15 depicts a top perspective view of the alternative embodiment shown in FIG. 14 wherein a plurality of rows are depicted.

In an alternative embodiment of the invention depicted in FIG. 12 the applicant's system includes an integrated curvature technology. Essentially the system is the same as that depicted in FIG. 1, with one large exception. In this embodiment, the entire structure is curved as shown. All structures therein are generally the same and for purposes of clarity have been given their same reference numbers as provided with regard to FIG. 1. In this embodiment and in the preferred embodiment the PWB may be flexible so that if necessary it may be curved.

The Applicant's LED lighting system is extremely scalable. The system may be configured for light output anywhere from that of a single LED, to replacements for high intensity floodlights in the range of 36 kW equivalent or higher. (Although in the preferred embodiment a plurality of LEDs are present). This scaling is accomplished by simply incorporating more LEDs into a given LED lighting system. Various examples of this scaling are illustrated in FIGS. 4, 5 and 7. As noted above, these LED lighting systems of various size and brightness may be configured for different spectrum, different focal and intensity patterns, and differently shaped lit areas by adjusting the layout of the LEDs, the bevel of each hole, and the LEDs used.

Figure 8:
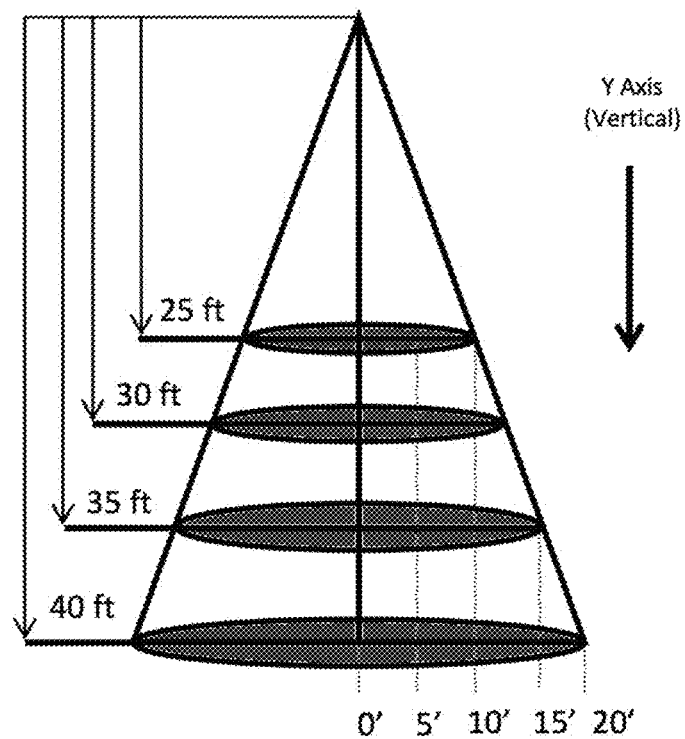
FIG. 8 depicts a diagram of the mythology of the field-testing performed on a 1 kW LED lighting system.

Due to the nature of the LED lighting system, including particularly the nature of the LEDs and their light dispersion through beveled holes, the illumination output from the system exhibits a sharp drop off at its edges, wherein light output falls off rapidly at the edge of the area lit. Thus, the system provides decreased light pollution as compared to conventional lighting systems of a similar light output. This feature of the LED lighting system is illustrated in FIGS. 8 and 9. Specifically, FIG. 9 shows data collected from a field test of one and two 1 kW equivalent LED lighting systems, and FIG. 8 is a diagram that clarifies the testing methodology. As may be seen from the data, the illumination provided by the LED lighting system falls off rapidly with horizontal distance from the focal point.

Because the Applicant's lighting system utilizes alternating current directly, and simply uses a transformer to regulate the power delivered to the LEDs therein, conventional dimmer switches for lighting as is known in the art are compatible. This is because the transformer in the Applicant's system simple provides a direct step down in power, and does not convert the alternating current to direct current. For the same reasons, the Applicant's system is also compatible with energy management systems, other lighting systems, and security systems. The system further provides benefits of extending the life of the LEDs employed, due to the reduced total time the LEDs are lit. Part of many energy management systems is the reduction in phantom power loss that occurs as many electronic devices draw a small amount of current even when they are powered off. One typical power draw is the DC power converter in many LED lighting systems. Because the Applicant's system has no power converter, accordingly there is no phantom power loss. Finally, the system provides an advantage in that it requires little to no warm-up period.

Preferably, the entire lighting figure (3D cad drawing) comprises both the lighting components, the heat dissipation components, and the necessary voltage transformation requirements. While an input power source of 110V alternating current at 60 hz is preferred, in alternative embodiments of the invention the power source my have a different current frequency (such as 50 hz in Europe) and a different voltage difference, such as 120V, 220V, 240V, 277V, and 480V.

The LED lighting apparatus and system may be described to comprise a plurality of LEDs, a faceplate comprising a beveled aperture through said faceplate directly above each LED, a power source; and wherein said faceplate is configured to draw heat from said LEDs. The apparatus may optionally comprise beveled apertures having a bevel between 0 and 120 degrees, and more preferably between 15 and 90 degrees.

The LED lighting apparatus may be further described to comprise a plurality of LEDs, a power source configured to provide AC power having a first ½ cycle and a second ½ cycle, a first and second electrical circuit, wherein said first circuit is continuous with said power source and a first half of said plurality of LEDs and configured to light said first half of said plurality of LEDs during said first ½ cycle, and wherein said second circuit is continuous with said power source and a second half of said plurality of LEDs and configured to light said second half of said plurality of LEDs during said second ½ cycle. Optionally each of said first half of said plurality of LEDs is adjacent to one or more LEDs within said second half of said plurality of LEDs. Optionally each of said first half of said plurality of LEDs is within $^{13}/_{16}{}^{th}$ of an inch of one or more LEDs within said second half of said plurality of LEDs.

The LED lighting apparatus may be further described to comprise a plurality of LEDs, a faceplate comprising a beveled aperture through said faceplate directly above each LED, a power source, and a heat dissipation component configured to draw heat from the back of said LEDs and exude it through an enclosure.

In use, the applicant's device provides an extremely efficient and low heat lighting solution to replace conventional lights and even other less efficient LED and fluorescent lights. Benefits to indoor use include the favorable impact on air conditioning, power usage, maintenance, insurance, and ease of installation.

With respect to the above description then, it is to be realized that material disclosed in the applicant's drawings and description may be modified in certain ways while still producing the same result claimed by the applicant. Such variations are deemed readily apparent and obvious to one skilled in the art, and all equivalent relationships to those illustrated in the drawings and equations and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact disclosure shown and described, and accordingly, all suitable modifications and equivalents may be resorted to, falling within the scope of the invention.

We claim:

1. An LED lighting apparatus comprising:
   a. a plurality of LEDs, each LED having an LED backside;
   b. a power source configured to provide AC power having a first ½ cycle and a second ½ cycle;
   c. a first and second electrical circuit;
   d. wherein said first circuit is continuous with said power source and a first half of said plurality of LEDs and configured to light said first half of said plurality of LEDs during said first ½ cycle;
   e. wherein said second circuit is continuous with said power source and a second half of said plurality of LEDs and configured to light said second half of said plurality of LEDs during said second ½ cycle;
   f. a faceplate consisting of a single piece of metal and configured to cool said LEDs;
   g. a light fixture housing;
   h. a heat transfer module in thermal contact with said LED backside and said light fixture housing; and
   i. a layer of insulating air between the heat transfer module and the light fixture housing at specified locations.

2. The LED lighting apparatus according to claim 1, wherein each of said first half of said plurality of LEDs is adjacent to one or more LEDs within said second half of said plurality of LEDs.

3. The LED lighting apparatus according to claim 1, wherein each of said first half of said plurality of LEDs is within 0.500 of an inch of one or more LEDs within said second half of said plurality of LEDs.

4. The LED lighting apparatus of claim 1 wherein said plurality of LEDs are arranged in an array.

5. The LED lighting apparatus of claim 4 wherein said array is arranged on a curved surface.

6. An LED lighting apparatus comprising,
   a. an array comprising a plurality of LEDs;
   b. a faceplate heat sink;
   c. a power source;
   d. a heat dissipation component configured to draw heat from the back of said LEDs and exude it through an enclosure, said heat dissipation component in contact with a light fixture housing; and
   e. a circuit supplying power to a first half of said plurality of LEDs at a first time a second half of said plurality of LEDs at a second time based on cycles of AC power provided by said power source; and
   f. a layer of insulating air between the heat dissipation component and the light fixture housing at specified locations.

7. The LED lighting apparatus of claim 6 wherein:
   a. said heat dissipation component has a thickness that exceeds four inches.

8. The LED lighting apparatus of claim 6:
   a. wherein said circuit comprises a first circuit half and a second circuit half;
   b. wherein said first circuit half is continuous with said power source and said first half of said plurality of LEDs and configured to light said first half of said plurality of LEDs during said first time; and
   c. wherein said second circuit half is continuous with said power source and said second half of said plurality of LEDs and configured to light said second half of said plurality of LEDs during said second time.

9. The LED lighting apparatus according to claim 8, wherein each of said first half of said plurality of LEDs is adjacent to one or more LEDs within said second half of said plurality of LEDs.

10. The LED lighting apparatus according to claim 8, wherein each of said first half of said plurality of LEDs is within 0.500 of an inch of one or more LEDs within said second half of said plurality of LEDs.

11. The LED lighting apparatus according to claim 8, wherein said first time corresponds to a first ½ cycle, and said second time corresponds to a second ½ cycle.

12. The LED lighting apparatus of claim 6 wherein said array is arranged on a curved surface.

13. The LED lighting apparatus according to claim 6, wherein said first time corresponds to a first ½ cycle, and said second time corresponds to a second ½ cycle.

* * * * *